US012546139B2

(12) United States Patent
Ufkes et al.

(10) Patent No.: US 12,546,139 B2
(45) Date of Patent: Feb. 10, 2026

(54) KEYLESS GATE LOCK APPARATUS AND SYSTEM

(71) Applicant: Security Enhancement Systems, LLC, Northbrook, IL (US)

(72) Inventors: Philip J. Ufkes, Sullivan's Island, SC (US); Steven J. Malone, Mt. Pleasant, SC (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 406 days.

(21) Appl. No.: 18/081,575

(22) Filed: Dec. 14, 2022

(65) Prior Publication Data

US 2023/0193657 A1 Jun. 22, 2023

Related U.S. Application Data

(60) Provisional application No. 63/289,568, filed on Dec. 14, 2021.

(51) Int. Cl.

| | |
|---|---|
| ***E05B 47/00*** | (2006.01) |
| ***G07C 9/00*** | (2020.01) |
| ***G07C 9/10*** | (2020.01) |
| ***G07C 9/20*** | (2020.01) |

(52) U.S. Cl.

CPC ...... *E05B 47/0001* (2013.01); *G07C 9/00309* (2013.01); *G07C 9/10* (2020.01); *G07C 9/20* (2020.01); *E05B 2047/0095* (2013.01)

(58) Field of Classification Search

CPC ............. E05B 65/0007; E05B 47/0001; E05B 2047/0095; E06B 11/00; E06B 11/02; E06B 11/08; E06B 11/026; G07C 9/20; G07C 9/10; G07C 9/00309

See application file for complete search history.

(56) References Cited

U.S. PATENT DOCUMENTS

| | | | |
|---|---|---|---|
| 9,728,022 | B2 | 8/2017 | Gengler et al. |
| 9,892,579 | B2 | 2/2018 | Ku |
| 10,089,811 | B2 | 10/2018 | Ufkes |

(Continued)

OTHER PUBLICATIONS

International Search Report, International application No. PCT/US22/52900. Date of mailing: Apr. 18, 2023. ISAUS, Alexandria, VA.

(Continued)

*Primary Examiner* — Christine M Mills
*Assistant Examiner* — Christopher F Callahan
(74) *Attorney, Agent, or Firm* — Gregory Finch; Finch Paolino, LLC

(57) ABSTRACT

A keyless gate lock apparatus and system. The keyless gate lock apparatus and system of the present disclosure may comprise a lock assembly comprising a housing configured to be coupled to a first surface of a gate or a fence, a lock plate configured to be coupled to a second surface of the gate or the fence, and a lock bar comprising an elongated body extending from a first end to a second end. The lock assembly may comprise an electronic lock assembly configured to establish a wireless data transfer interface with a mobile electronic device and selectively actuate at least one locking mechanism to unlock the lock bar from the lock assembly in response to authorizing an access request from the mobile electronic device.

6 Claims, 12 Drawing Sheets

(56) References Cited

U.S. PATENT DOCUMENTS

| | | | | |
|---|---|---|---|---|
| 2012/0229251 | A1* | 9/2012 | Ufkes | E05B 83/10<br>340/5.26 |
| 2018/0030759 | A1* | 2/2018 | Chanbonpin | E05B 65/0007 |
| 2019/0234112 | A1* | 8/2019 | Hong | E05B 15/0033 |
| 2020/0364960 | A1* | 11/2020 | Leask | G07C 9/00896 |

OTHER PUBLICATIONS

Written Opinion of the International Searching Authority, International application No. PCT/US22/52900. Date of mailing: Apr. 18, 2023. ISA/US, Alexandria, VA.

* cited by examiner

KEYLESS GATE LOCK APPARATUS AND SYSTEM

CROSS-REFERENCE TO RELATED APPLICATIONS

This application claims priority benefit of U.S. Provisional Application Ser. No. 63/289,568, filed Dec. 14, 2021, entitled "KEYLESS GATE LOCK APPARATUS"; the entirety of which is hereby incorporated herein at least by virtue of this reference.

FIELD

The present disclosure relates to the field of electronic access control devices and systems; in particular a keyless gate lock apparatus and system for selectively securing an entry gate of a secured enclosure.

BACKGROUND

Electronic access control (EAC) is the technology used to provide and deny physical or virtual access to a physical or virtual space. EAC provides technology for various security applications, including, controlling who can go where and when; controlling traffic in and out of areas; restricting and granting access to authorized persons and granular user roles; restricting and granting access to authorized vehicles and networked devices; and administering accountability rules and specified access procedures and protocols. Installing and administering EAC devices and solutions at exterior access points, such as at access gates for perimeter fences, require specialized EAC equipment adapted for use in outdoor environments. Remotely located, geographically dispersed sites of high value assets also require specialized EAC solutions to enforce site access procedures, ensure access integrity and process compliance, as well as improve site security, safety and workflow management.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a keyless locking apparatus and system. In accordance with certain embodiments, the keyless locking apparatus and system of the present disclosure may comprise a lock assembly comprising a housing configured to be coupled to a first surface of a gate or a fence, a lock plate configured to be coupled to a second surface of the gate or the fence, and a lock bar comprising an elongated body extending from a first end to a second end. The elongated body may comprise a plurality of teeth disposed on a linear portion of the elongated body between the first end and the second end. The second end of the lock bar may comprise a retaining member configured to selectively interface with a receiving portion of the lock plate. In accordance with certain embodiments, the lock bar is configured to slidably interface with the lock assembly. The lock assembly may comprise at least one latching mechanism configured to establish a locking interface with the plurality of teeth to selectively secure the lock bar to the lock assembly in at least one direction; for example, the at least one latching mechanism may enable the lock bar to slide laterally from right-to-left but may restrict the lock bar from sliding laterally from left-to-right via the locking interface between the at least one latching mechanism and the plurality of teeth. In accordance with certain aspects of the present disclosure, the lock assembly may further comprise an electronic actuator operably engaged with a blocking mechanism. The electronic actuator may be configured to actuate the blocking mechanism between a first position and a second position, wherein the blocking mechanism is configured to retain the at least one latching mechanism in a locked configuration when the blocking mechanism is configured in the first position. The lock assembly may further comprise a controller operably engaged with the electronic actuator. The controller may a wireless communications module (e.g., a BLUETOOTH chipset), at least one processor and at least one non-transitory computer readable medium comprising instructions stored thereon that, when executed, cause the processor to perform one or more operations. In accordance with certain aspects of the present disclosure, the one or more operations may comprise operations for establishing a wireless data transfer interface with at least one mobile electronic device; receiving electronic access credentials from the at least one mobile electronic device via the wireless data transfer interface; authenticating the electronic access credentials; and commanding the electronic actuator to actuate the blocking mechanism from the first position to the second position in response to successfully authenticating the electronic access credentials.

In accordance with certain embodiments of the keyless locking system, the lock assembly may further comprise a release mechanism configured to disengage the locking interface between the at least one latching mechanism and the plurality of teeth. The release mechanism may include an actuator disposed at an exterior surface of the housing (e.g., a button configured to be depressed by a user of the system). In certain embodiments, the keyless locking system may further comprise a first mounting attachment configured to be coupled to the first surface of the gate or the fence, wherein the housing of the lock assembly is configured to be coupled to the first mounting attachment. In said embodiments, the keyless locking system may further comprise a second mounting attachment configured to be coupled to the second surface of the gate or the fence, wherein the lock plate is configured to be coupled to the second mounting attachment. In said embodiments, the keyless locking system may further comprise a mounting plate configured to be coupled to the first mounting attachment, wherein the housing of the lock assembly is configured to be coupled to the mounting plate. In accordance with certain embodiments of the keyless locking system, the receiving portion of the lock plate may comprise a raised strap extending from a front surface of the lock plate and defining a slotted aperture configured to receive a distal end of the retaining member of the lock bar therethrough. In said embodiments, the raised strap may be oriented substantially perpendicularly to the lock bar such that the lock plate is configured to restrict forward and backward movement of the lock bar when the retaining member is selectively interfaced with the raised strap.

Further aspects of the present disclosure provide for a keyless locking system comprising a mounting plate configured to be coupled to a first surface of a gate or a fence; a lock assembly comprising a housing and a curved connector portion coupled to a surface of the housing; a lock plate configured to be coupled to a second surface of the gate or the fence; and a lock bar comprising an elongated body extending from a first end to a second end. In certain embodiments, the mounting plate may a vertical bar extending from a front surface of the mounting plate. The curved connector portion may be configured to be removably coupled to the vertical bar of the mounting plate such that the lock assembly is configured to rotate around an axis of the vertical bar when the curved connector portion is removably coupled to the vertical bar of the mounting plate. In certain embodiments, the elongated body comprises a plurality of teeth disposed on a linear portion of the elongated body between the first end and the second end. In certain embodiments, the second end of the lock bar comprises a retaining member configured to selectively interface with a receiving portion of the lock plate. The lock bar may be configured to slidably interface with the lock assembly and the lock assembly may comprise at least one latching mechanism configured to establish a locking interface with the plurality of teeth slidably when the lock bar is interfaced with the lock assembly. The at least one latching mechanism may be configured to selectively secure the lock bar to the lock assembly in at least one direction; for example, the at least one latching mechanism may enable the lock bar to slide laterally from right-to-left but may restrict the lock bar from sliding laterally from left-to-right via the locking interface between the at least one latching mechanism and the plurality of teeth. In accordance with certain aspects of the present disclosure, the lock assembly may further comprise an electronic actuator operably engaged with a blocking mechanism. The electronic actuator may be configured to actuate the blocking mechanism between a first position and a second position, wherein the blocking mechanism is configured to retain the at least one latching mechanism in a locked configuration when the blocking mechanism is configured in the first position. The lock assembly may further comprise a controller operably engaged with the electronic actuator. The controller may comprise a wireless communications module, at least one processor and at least one non-transitory computer readable medium comprising instructions stored thereon that, when executed, cause the processor to perform one or more operations. In certain embodiments, the one or more operations comprise operations for establishing a wireless data transfer interface with at least one mobile electronic device; receiving electronic access credentials from the at least one mobile electronic device via the wireless data transfer interface; authenticating the electronic access credentials; and commanding the electronic actuator to actuate the blocking mechanism from the first position to the second position in response to successfully authenticating the electronic access credentials.

In accordance with certain embodiments of the keyless locking system, the lock bar is configured to restrict the lock assembly from rotating around the axis of the vertical bar when the retaining member of the lock bar is selectively interfaced with the receiving portion of the lock plate. In said embodiments, the curved connector portion is configured to securely couple the lock assembly to the vertical bar of the mounting plate when the retaining member of the lock bar is selectively interfaced with the receiving portion of the lock plate.

Still further aspects of the present disclosure provide for a keyless locking system comprising a mounting plate configured to be coupled to a surface of a gate or a fence, the mounting plate comprising a tab extending laterally from a front surface of the mounting plate; a lock assembly comprising a housing configured to be coupled to the mounting plate; and a lock bar comprising an elongated body extending from a first end to a second end. In certain embodiments, the mounting plate may comprise a tab (e.g., a protruding structure) extending laterally from a front surface of the mounting plate. The elongated body may comprise a plurality of teeth disposed on a linear portion of the elongated body between the first end and the second end. The lock bar comprises a retaining member (e.g., a curved bar) coupled to the second end of the lock bar. In certain embodiments, the retaining member is configured to receive a piece of link chain. In certain embodiments, the lock bar is configured to slidably interface with the lock assembly. The lock assembly may comprise at least one latching mechanism configured to establish a locking interface with the plurality of teeth to selectively secure the lock bar to the lock assembly in at least one direction when the lock bar is slidably interfaced with the lock assembly. In certain embodiments, a distal tip of the retaining member (e.g., an end of the curved bar) is configured to interface with the tab when the lock bar is slidably interfaced with the lock assembly. In accordance with certain aspects of the present disclosure, the tab is configured to retain the piece of link chain on the retaining member when the distal tip of the retaining member is interfaced with the tab (e.g., prevent the link chain from being removed from the retaining member). For example, in certain embodiments the tab comprises an aperture configured to receive the distal tip of the retaining member therethrough. In accordance with certain aspects of the present disclosure, the lock assembly may further comprise an electronic actuator operably engaged with a blocking mechanism. The electronic actuator may be configured to actuate the blocking mechanism between a first position and a second position, wherein the blocking mechanism is configured to retain the at least one latching mechanism in a locked configuration when the blocking mechanism is configured in the first position. The lock assembly may further comprise a controller operably engaged with the electronic actuator. The controller may comprise a wireless communications module, at least one processor and at least one non-transitory computer readable medium comprising instructions stored thereon that, when executed, cause the processor to perform one or more operations. In certain embodiments, the one or more operations comprise operations for establishing a wireless data transfer interface with at least one mobile electronic device; receiving electronic access credentials from the at least one mobile electronic device via the wireless data transfer interface; authenticating the electronic access credentials; and commanding the electronic actuator to actuate the blocking mechanism from the first position to the second position in response to successfully authenticating the electronic access credentials.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative descriptions with reference to the following drawings in which.

DETAILED DESCRIPTION

Figure 1:
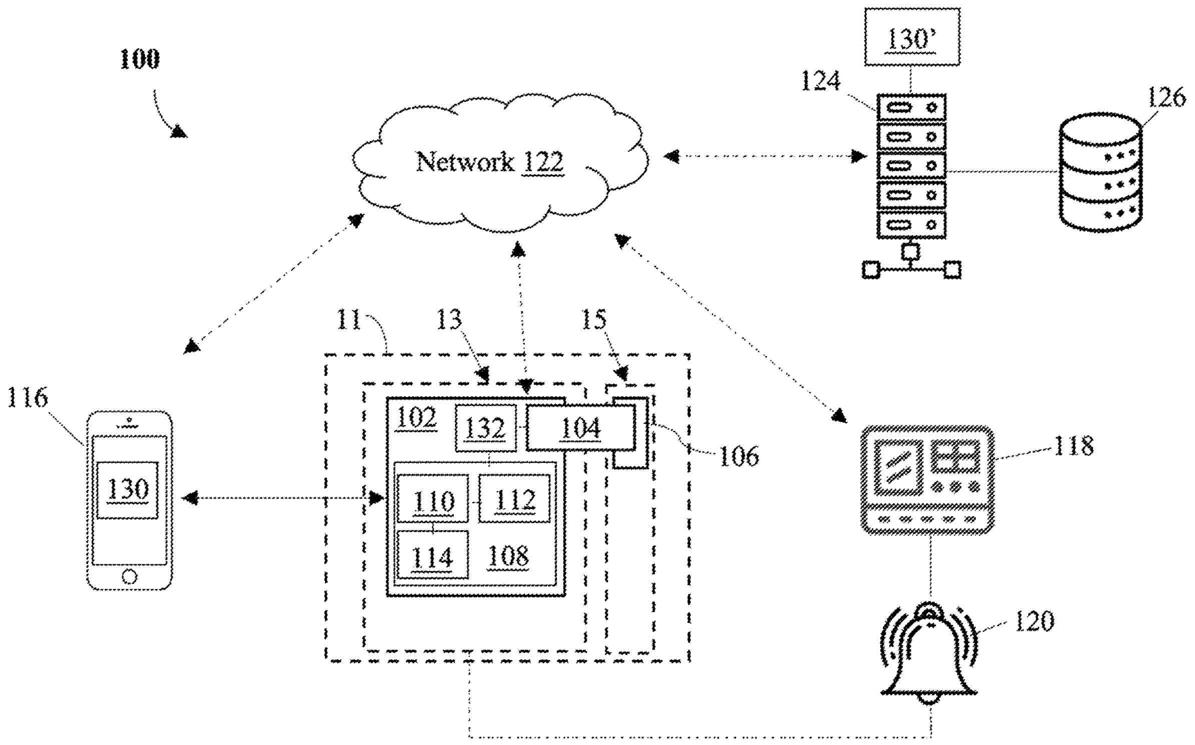
FIG. 1 is an architecture diagram of a keyless gate lock system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Descriptions of well-known starting materials, processing techniques, components and equipment are omitted so as not to unnecessarily obscure the invention in detail. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems comprise a keyless gate lock apparatus and system. The keyless gate lock apparatus and system of the present disclosure may comprise a lock assembly comprising a housing configured to be coupled to a first surface of a gate or a fence, a lock plate configured to be coupled to a second surface of the gate or the fence, and a lock bar comprising an elongated body extending from a first end to a second end. The lock assembly may comprise an electronic lock assembly configured to establish a wireless data transfer interface with a mobile electronic device and selectively actuate at least one locking mechanism to unlock the lock bar from the lock assembly in response to authorizing an access request from the mobile electronic device.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one BLUETOOTH advertisement channel.

As used herein, the term "signal" refers to any electromagnetic or electrical current that carries data from one electrical component of a system or apparatus to another or from one system or network to another.

As used herein, the term "command signal" refers to any signal that carries data configured to command, actuate, instantiate and/or instruct one or more action or operation by one or more electrical component of a system or apparatus.

Certain benefits and advantages of the present disclosure provide for a keyless gate lock apparatus and system configured to secure access gates and perimeter fences at remote sites while enabling flexible electronic access controls to a variety of users.

Certain exemplary embodiments of the present disclosure provide for a keyless gate lock apparatus and system engineered to resist intrusion attempts that occur at remote, unattended locations and/or unoccupied locations after business hours. In accordance with certain aspects of the present disclosure, the keyless storage apparatus can be easily installed onto a gate and fence pole to secure a perimeter access fence.

Certain benefits and advantages of the present disclosure include a keyless gate lock apparatus and system configured to communicate with one or more mobile electronic device to receive and process a wireless access control request from one or more users of an electronic access control system, such as field service technicians. In accordance with certain aspects of the present disclosure, the mobile electronic device comprises a native or web-based smartphone application configured to provide on-demand access to the keyless gate lock by authorized personnel and providing an audit trail.

Certain benefits and advantages of the present disclosure include a keyless gate lock apparatus with military-grade encryption and high-strength steel construction.

Certain benefits and advantages of the present disclosure include a keyless gate lock apparatus with intrusion-resistant internal attributes and long-lasting battery and cycle count.

Certain benefits and advantages of the present disclosure include a keyless gate lock apparatus and system with improved resistance/resilience against intrusion attempts, including one or more anti-tamper sensor(s).

Certain benefits and advantages of the present disclosure include a keyless gate lock apparatus and system configured to establish a wireless data transfer interface with one or more mobile electronic devices and a backend remote server. The keyless gate lock apparatus and system may comprise one or more communications protocols to provide for synchronization between the keyless gate lock apparatus and the backend remote server.

Certain benefits and advantages of the present disclosure include a keyless gate lock apparatus and system configured to enable compliance with one or more audit trail regulatory requirements.

Turning now descriptively to the drawings, in which similar reference characters denote similar elements throughout the several views, FIG. 1 depicts an architecture diagram of keyless gate lock system 100. In accordance with certain aspects of the present disclosure, system 100 may be configured to selectively secure an access point of a secured site 11. The access point may comprise a gate 13 coupled to a fence 15 comprising an enclosure for secured site 11. System 100 may comprise a lock assembly 102, a lock bar 104 and, optionally, a lock plate 106. In accordance with certain aspects of the present disclosure, lock assembly 102 may be securely coupled to a surface of gate 13 and lock plate 106 may be securely coupled to a surface of fence 15; e.g., a fence pole. Lock bar 104 may be configured to be selectively interfaced with lock assembly 102 at a first end of lock bar 104 and selectively interfaced with lock plate 106 at a second end of lock bar 104 in order to selectively secure gate 13 to fence 15. Lock assembly 102 may comprise a controller 108 operably engaged with an electronic actuator 132 to selectively actuate at least one locking mechanism of lock assembly 102 between a locked position and an unlocked position. Controller 108 may comprise at least one processor 110, memory device 112 and wireless communications module 114.

In accordance with certain aspects of the present disclosure, system 100 may comprise at least one mobile device 116. Mobile device 116 may comprise a mobile computing device, including but not limited to a smart phone or a tablet computer. Mobile device 116 may comprise a mobile software application 130 executing thereon. Mobile software application 130 comprises a graphical user interface configured to enable a user of mobile device 116 to provide one or more user-generated inputs and execute one or more electronic access control (EAC) operations within system 100. In accordance with certain embodiments, mobile software application 130 is configured to command mobile device 116 to send at least one wireless signal (e.g., a BLUETOOTH advertisement) to controller 108. Controller 108 may receive the wireless signal via wireless communications module 114 and process at least one data packet contained in the wireless signal to establish a wireless data transfer interface between controller 108 and mobile device 116. In accordance with certain aspects of the present disclosure, the user may configure an electronic access request for lock assembly 102 at mobile software application 130 and communicate the electronic access request to controller 108 via the wireless data transfer. The electronic access request may comprise one or more electronic access credentials (e.g., an electronic access code, authentication token and/or user identification code) for lock assembly 102. Controller 108 may receive the electronic access credentials at processor 110 via wireless communications module 114. Processor 110 may be communicably engaged with memory 112 to execute one or more processor-executable instructions stored in memory 112 to authenticate the electronic access credentials to grant or deny the electronic access request. Upon successfully authenticating the electronic access credentials at processor 110, controller 108 may be configured to send a command signal to electronic actuator 132 to actuate the at least one locking mechanism such that the lock bar 104 may be selectively unlocked from lock assembly 102.

In accordance with certain aspects of the present disclosure, system 100 may further comprise an EAC server 124 communicably engaged with an EAC database 126. EAC server 124 may comprise an EAC software application 130' comprising a server-side instance of mobile software application 130. In certain embodiments, mobile device 116 and/or controller 108 may be communicably engaged with EAC server 124 via a network interface 122. Network interface 122 may comprise a wireless communications network, such as 4G or 5G. In certain embodiments, EAC server 124 may be configured to instantiate an instance of mobile software application 130 at mobile device 116. EAC server 124 may be configured to authenticate mobile device 116 to generate at least one authentication token for mobile device 116 and may communicate the authentication token to mobile device 116 and/or controller 108 via network interface 122. Controller 108 may be communicably engaged with EAC server 124 to send activity data for lock assembly 102 to EAC server 124. EAC server 124 may be configured to receive and process the activity data to generate an audit log for lock assembly 102. EAC server 124 may be communicably engaged with controller 108 via network interface 122 to provision one or more processor-executable instructions (e.g., firmware) stored in memory 112. Controller 108 may be configured to receive and process the electronic access credentials from mobile 116 according to the processor-executable instructions provisioned by EAC server 124.

In accordance with certain aspects of the present disclosure, system 100 comprises at least one alarm system controller 118 operably engaged with at least one alarm 120. Alarm system controller 118 and alarm 120 may be operably configured to provide at least one alarm to detect and/or alert an unauthorized access attempt at gate 13. In accordance with certain embodiments, alarm controller 118 may be communicably engaged with one or more of controller 108, EAC server 124 and/or mobile device 116 to perform one or more operations within system 100. In accordance with certain embodiments, alarm system controller 118 is communicably engaged with controller 108 via network interface 122 to receive one or more data inputs. EAC server 124 may, optionally, serve as a broker for communications between alarm system controller 118 and controller 108. In accordance with certain embodiments, controller 108 may send at least one communication (e.g., comprising at least one data packet) to alarm system controller 118 in response to authenticating the electronic access credentials for mobile device 116. Alarm system controller 118 may process the communication received from controller 108 according to one or more alarm system parameters to suppress alarm 120. In certain embodiments, alarm system controller 118 may communicate a confirmation signal to controller 108 in response to suppressing alarm 120. Controller 108 may authorize the access request and command electronic actuator 132 to unlock lock assembly 102 in response to receiving the confirmation signal from alarm system controller 118. The user may subsequently access gate 13 without triggering alarm 120.

Figure 2:
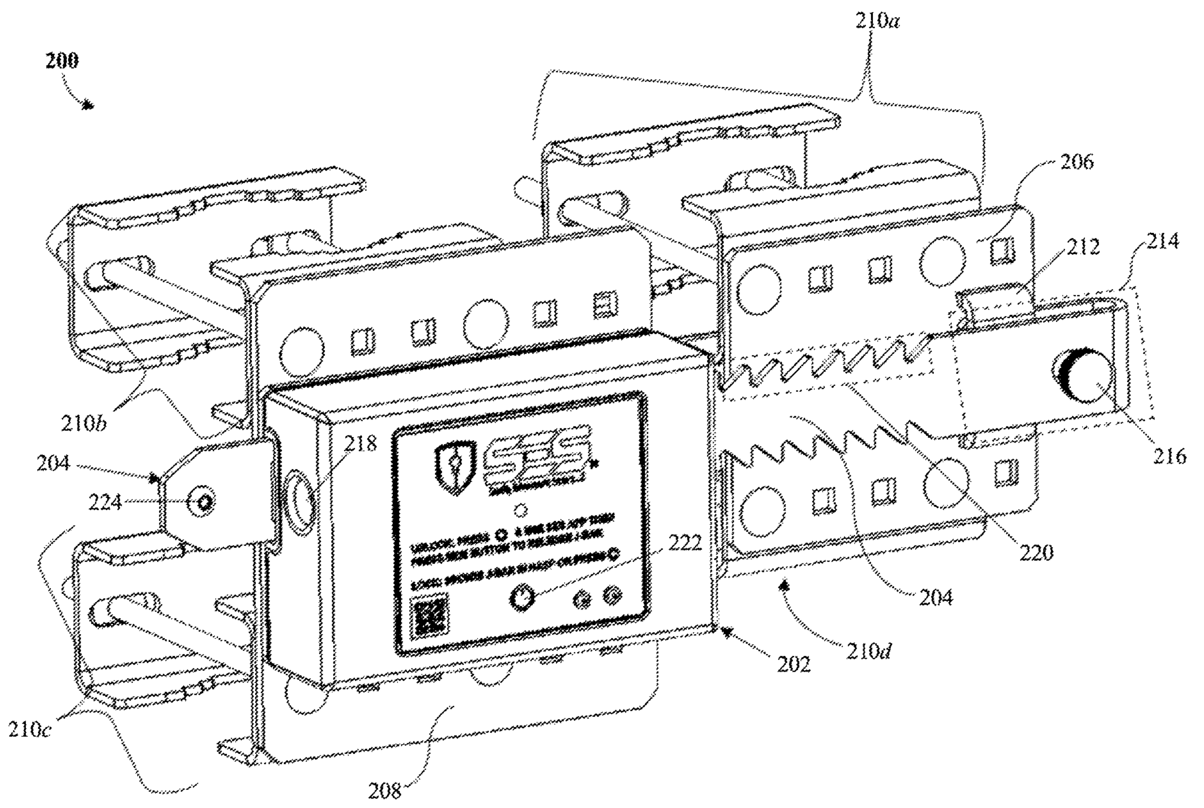
FIG. 2 is an illustration of a keyless gate lock apparatus, in accordance with certain aspects of the present disclosure.

Referring now to FIG. 2, an illustration of a keyless gate lock apparatus 200 is shown. In accordance with certain aspects of the present disclosure, keyless gate lock apparatus 200 may comprise an embodiment of lock assembly 102, lock bar 104 and lock plate 106 (as shown in FIG. 1) and may be operably engaged within an embodiment of system 100 (as shown in FIG. 1). In accordance with certain embodiments, keyless gate lock apparatus 200 may comprise a lock assembly 202, a lock bar 204 and a lock plate 206. Keyless gate lock apparatus 200 may comprise one or more brackets 210*a-d* configured to be securely coupled to a surface of a gate and a fence; e.g., a gate pole and a fence pole. In certain embodiments, keyless gate lock apparatus 200 may comprise a mounting plate 208 configured to be securely coupled to brackets 210*b,c*. Lock plate 206 may be configured to be securely coupled to brackets 210*a,d*. Lock assembly 202 may be configured to be securely coupled to mounting plate 208 in order to secure lock assembly 202 to the surface of the gate and the fence.

In accordance with certain aspects of the present disclosure, lock bar 204 may be configured to establish a selective locking interface between lock assembly 202 and lock plate 206. In certain embodiments, lock bar 204 may comprise an elongated bar comprising a plurality of teeth 220 disposed on a length of lock bar 204. As shown in FIG. 2, plurality of teeth 220 comprise a plurality of angled apertures disposed on lock bar 204. It is anticipated that plurality of teeth 220 may be configured as one or more flange, protrusion, member or other structure disposed on a surface of lock bar 204 and/or one or more slots, apertures or other receiving portions configured to receive a pin or other structure therethrough. Lock bar 204 may be configured to slidably interface with lock assembly 202 to engage at least one tooth in the plurality of teeth 220 with at least one latching mechanism of lock assembly 202 (e.g., when lock bar 204 is slid in a first direction). In certain embodiments, lock bar 204 may comprise a retaining screw 224 disposed near a first end of lock bar 204. Retaining screw 224 may be configured to restrict lock bar 204 from being removed from lock assembly 202 (e.g., when lock bar 204 is slid in a second direction). Lock bar 204 may comprise a connector portion 214 comprising a second end of lock bar 204 (e.g., opposite the first end). Connector portion 214 may comprise rear surface of lock bar 204 that is bent 180-degrees around a front surface of lock bar 204, as shown in FIG. 2. Lock plate 206 may comprise a receiving portion 212 disposed on a surface of lock plate 206. Receiving portion 212 may comprise a raised bar or strap comprising a slotted apertured configured to receive a length of connector portion 214 therethrough, as shown in FIG. 2. In certain embodiments, lock bar 204 may comprise a handle 216 disposed on the front surface of lock bar 204 configured to enable a user of keyless gate lock apparatus 200 to slide lock bar 204 between the first direction and the second direction; e.g., right-to-left and left-to-right.

In accordance with certain aspects of the present disclosure, lock assembly 202 may comprise an interface button 222 disposed on an exterior surface of lock assembly 202. Interface button 222 may be operably engaged with a controller of lock assembly 202 (e.g., controller 108 of FIG. 1) to engage lock assembly 202 from a sleep state to an operational state when pressed by a user of keyless gate lock apparatus 200. The user of keyless gate lock apparatus 200 may establish a wireless data transfer interface with lock assembly 202 via a mobile electronic device to provide electronic access credentials to lock assembly 202 and electronically actuate lock assembly 202 to an unlocked state; e.g., as described in FIG. 1. Lock assembly 202 may comprise a lock release button 218 configured to disengage the at least one latching mechanism of lock assembly 202 from the plurality of teeth 220 (as described in more detail below). Upon disengaging the at least one latching mechanism of lock assembly 202 from the plurality of teeth 220, the user may laterally slide lock bar 204 (e.g., from left-to-right when configured as shown in FIG. 2) to disengage connector portion 214 of lock bar 204 from receiving portion 212 of lock plate 206. Upon disengaging the interface between lock bar 204 and lock plate 206, the user may access the gate. When access is complete, the user may restore keyless gate lock apparatus 200 to the locked configuration by aligning connector portion 214 of lock bar 204 with receiving portion 212 of lock plate 206 and laterally sliding lock bar 204 (e.g., from right-to-left when configured as shown in FIG. 2) such that connector portion 214 extends through the slotted aperture of receiving portion 212. Upon laterally sliding lock bar 204, plurality of teeth 220 may be interfaced with the at least one latching mechanism of lock assembly 202 to retain lock bar 204 in a locked position. In certain embodiments, the user may press interface button 222 to command the controller of lock assembly 202 to actuate a locking mechanism to secure lock assembly 202 in a locked state.

Figure 3A:
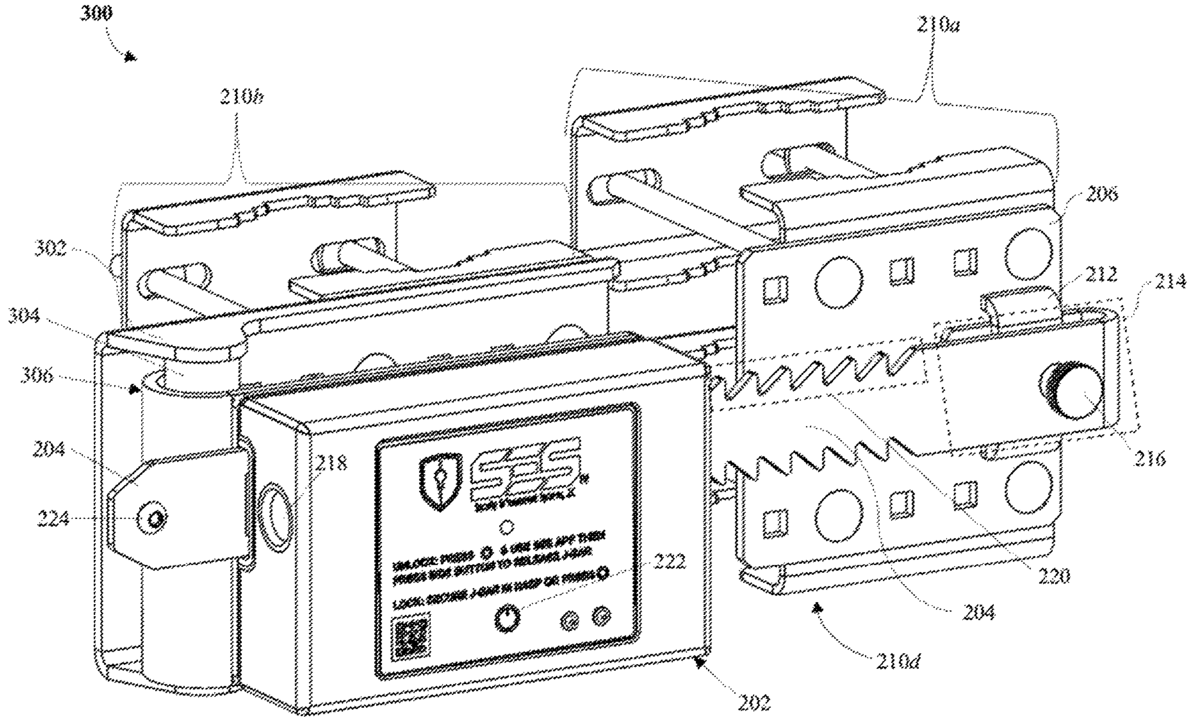
FIG. 3A is an illustration of a keyless gate lock apparatus in a locked configuration, in accordance with certain aspects of the present disclosure.
Figure 3B:
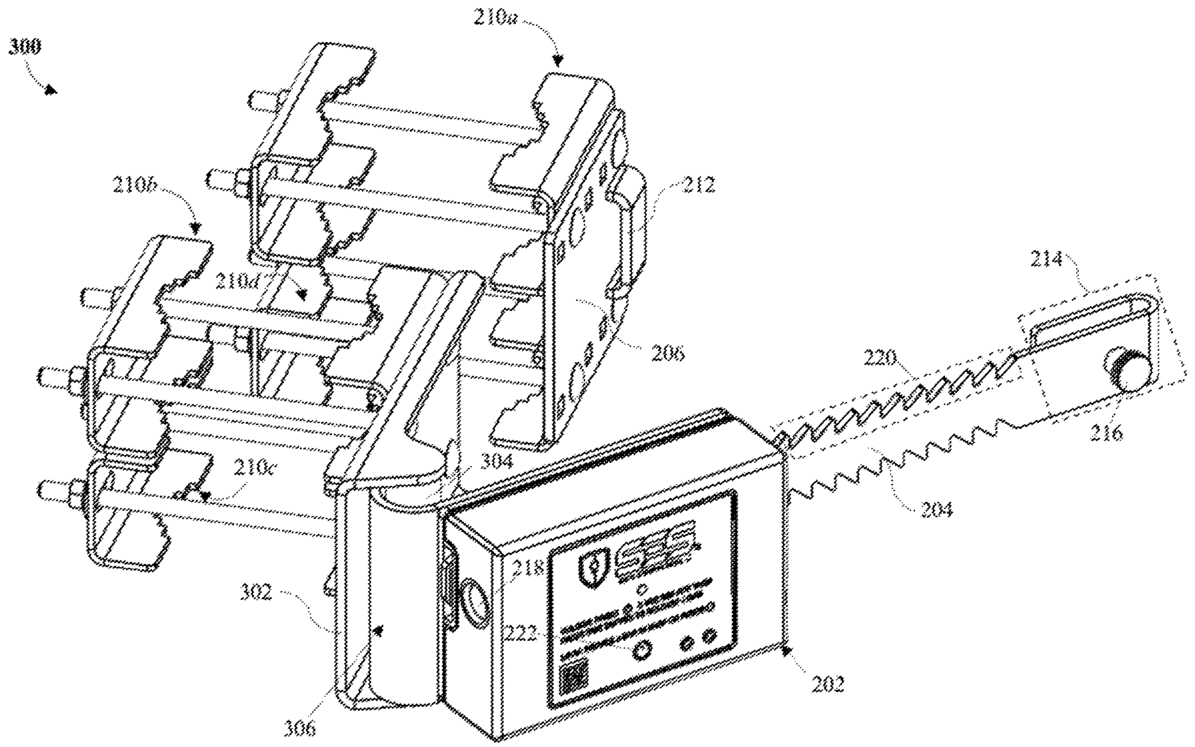
FIG. 3B is an illustration of a keyless gate lock apparatus in an unlocked configuration, in accordance with certain aspects of the present disclosure.

Referring now to FIGS. 3A-3B, illustrations of a keyless gate lock apparatus 300 are shown. In accordance with certain aspects of the present disclosure, keyless gate lock apparatus 300 may comprise an embodiment of lock assembly 102, lock bar 104 and lock plate 106 (as shown in FIG. 1) and may be operably engaged within an embodiment of system 100 (as shown in FIG. 1). In accordance with certain embodiments, keyless gate lock apparatus 300 may comprise lock assembly 202, lock bar 204 and lock plate 206, in accordance with keyless gate lock apparatus 200 (as shown in FIG. 2). Keyless gate lock apparatus 300 may comprise one or more brackets 210*a-d* configured to be securely coupled to a surface of a gate and a fence; e.g., a gate pole and a fence pole. In certain embodiments, keyless gate lock apparatus 300 may comprise a mounting plate 302 configured to be securely coupled to brackets 210*b* and 210*c* (not shown in FIG. 3A). Lock plate 206 may be configured to be securely coupled to brackets 210*a,d*. Mounting plate 302 may comprise a vertical bar 306 extending from a surface of mounting plate 302 and secured at a top portion and a bottom portion of mounting plate 302. Keyless gate lock apparatus 300 may comprise a mounting plate connector 306 coupled to a rear surface of lock assembly 202. Mounting plate connector 306 may comprise a curved, U-shaped portion configured to interface with vertical bar 304. As shown in FIG. 3A, the interface between mounting plate connector 306 and vertical bar 304 is configured to securely retain lock assembly 202 to mounting plate 302 when keyless gate lock apparatus 300 is configured in a locked position.

In accordance with certain aspects of the present disclosure, lock bar 204 may be configured to establish a selective locking interface between lock assembly 202 and lock plate 206 (as shown in FIG. 3A). In certain embodiments, lock bar 204 comprises an elongated bar comprising a plurality of teeth 220 disposed on a length of lock bar 204. Lock bar 204 is configured to slidably interface with lock assembly 202 to engage at least one tooth in the plurality of teeth 220 with at least one latching mechanism of lock assembly 202 (e.g., when lock bar 204 is slid in a first direction). In certain embodiments, lock bar 204 may comprise retaining screw 224 disposed near a first end of lock bar 204. Retaining screw 224 is configured to restrict lock bar 204 from being slidably removed from lock assembly 202. Lock bar 204 may comprise connector portion 214 comprising a second end of lock bar 204 (e.g., opposite the first end). Connector portion 214 may comprise rear surface of lock bar 204 that is bent 180-degrees around a front surface of lock bar 204, as shown in FIGS. 3A-3B. Lock plate 206 may comprise a receiving portion 212 disposed on a surface of lock plate 206. Receiving portion 212 may comprise a raised bar or strap comprising a slotted apertured configured to receive a length of connector portion 214 therethrough, as shown in FIGS. 3A-3B. In certain embodiments, lock bar 204 may comprise a handle 216 disposed on the front surface of lock bar 204 configured to enable a user of keyless gate lock apparatus 300 to slide lock bar 204 between the first direction and the second direction; e.g., right-to-left and left-to-right.

In accordance with certain aspects of the present disclosure, lock assembly 202 may comprise an interface button 222 disposed on the exterior surface of lock assembly 202. Interface button 222 may be operably engaged with a controller of lock assembly 202 (e.g., controller 108 of FIG. 1) to engage lock assembly 202 from a sleep state to an operational state when pressed by a user of keyless gate lock apparatus 300. The user of keyless gate lock apparatus 300 may unlock lock assembly 202 in the same manner as described in FIG. 2, above. Upon disengaging the at least one latching mechanism of lock assembly 202 from the plurality of teeth 220, the user may laterally slide lock bar 204 to disengage connector portion 214 of lock bar 204 from receiving portion 212 of lock plate 206. Upon disengaging the interface between lock bar 204 and lock plate 206, the user may rotate lock assembly 202 around an axis of vertical bar 304 via the interface between mounting plate connector 306 and vertical bar 304 (as shown in FIG. 3B) to disengage keyless gate lock apparatus 300 and, optionally, remove lock assembly 202 from mounting plate 302. When access is complete, the user may restore keyless gate lock apparatus 200 to the locked configuration by rotating lock assembly 202 around the axis of vertical bar 304 via the interface between mounting plate connector 306 and vertical bar 304 and subsequently aligning connector portion 214 of lock bar 204 with receiving portion 212 of lock plate 206 and laterally sliding lock bar 204 (e.g., from right-to-left when configured as shown in FIGS. 3A-3B) such that connector portion 214 extends through the slotted aperture of receiving portion 212. Upon laterally sliding lock bar 204, plurality of teeth 220 may be interfaced with the at least one latching mechanism of lock assembly 202 to retain lock bar 204 in the locked position (e.g., as shown in FIG. 3A). In certain embodiments, the user may press interface button 222 to command the controller of lock assembly 202 to actuate a locking mechanism to secure lock assembly 202 in a locked state.

Figure 4A:
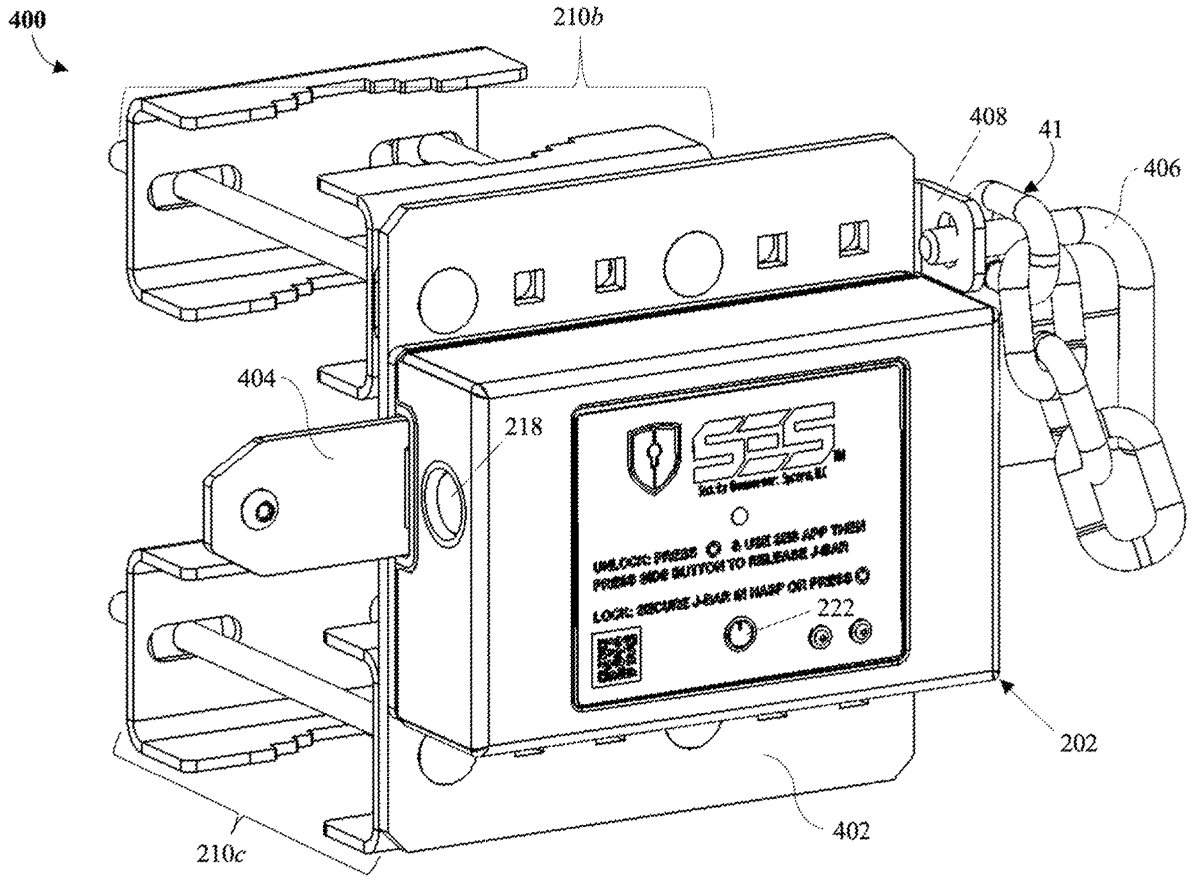
FIG. 4A is an illustration of a keyless gate lock apparatus in a locked configuration, in accordance with certain aspects of the present disclosure.
Figure 4B:
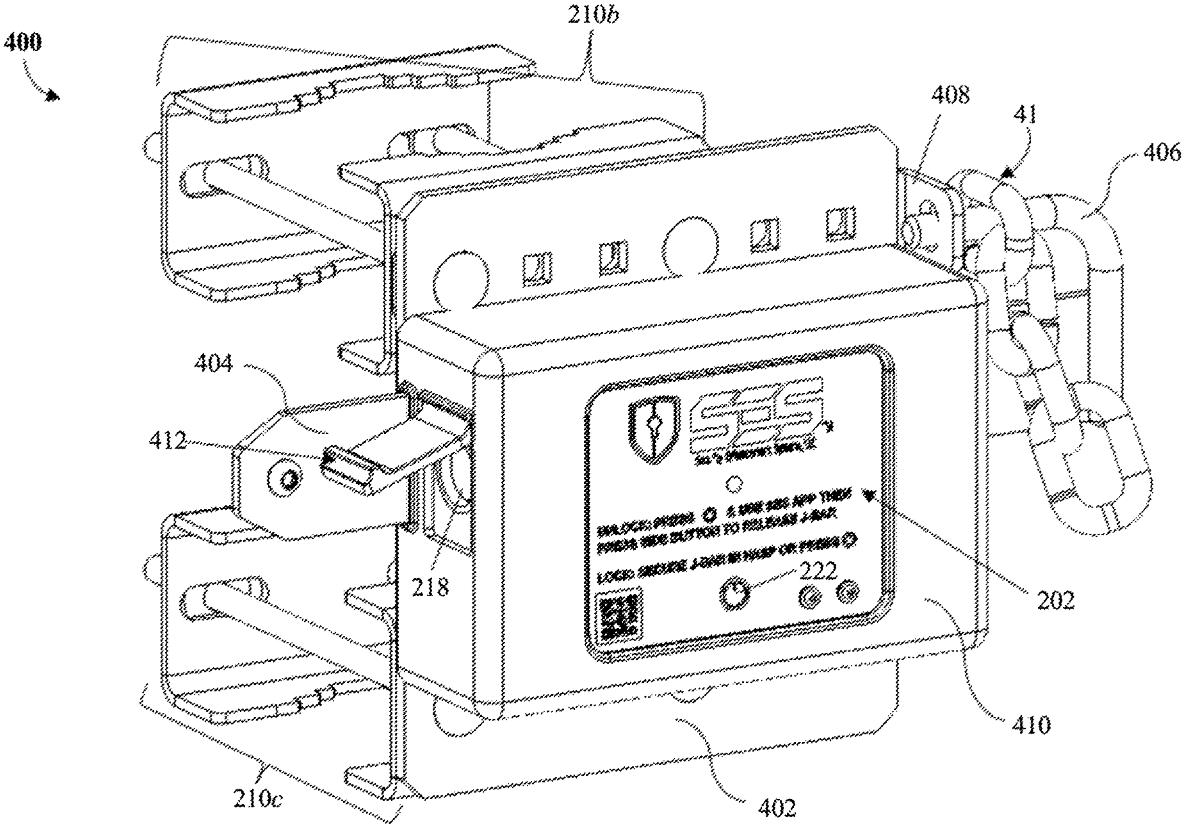
FIG. 4B is an illustration of a keyless gate lock apparatus in a locked configuration, in accordance with certain aspects of the present disclosure.

Referring now to FIGS. 4A-4B, illustrations of a keyless gate lock apparatus 400 is shown. In accordance with certain aspects of the present disclosure, keyless gate lock apparatus 400 may comprise lock assembly 202, as described in FIGS. 2 and 3A-3B above. In accordance with certain aspects of the present disclosure, keyless gate lock apparatus 400 may be operably engaged within an embodiment of system 100 (as shown in FIG. 1). Keyless gate lock apparatus 400 may comprise an alternative embodiment of keyless gate lock apparatus 200 (as shown in FIG. 2) and may comprise an alternative embodiment of keyless gate lock apparatus 300 (as shown in FIGS. 3A-3B). In accordance with certain aspects of the present disclosure, keyless gate lock apparatus 400 may comprise a mounting plate 402 configured to be securely coupled to brackets 210*b,c*. Lock assembly 202 may be configured to be securely coupled to mounting plate 402. Lock assembly 202 may the same as described in FIGS. 2 and 3A-3B above and may comprise lock release button 218 and interface button 222, as described in FIGS. 2 and 3A-3B above. Mounting plate 402 may comprise a tab 408 extending laterally from a surface of mounting plate 402. Tab 408 may comprise a metal plate, a bar, a staple or other structure configured to establish and retain a mechanical interface as described herein. Keyless gate lock apparatus 400 comprises a lock bar 404 configured to be slidably interfaced with lock assembly 202. In accordance with certain aspects of the present disclosure, lock bar 404 comprises an elongated bar comprising a plurality of teeth disposed on a length of lock bar 404. The plurality of teeth is not shown in FIGS. 4A-4B but comprise the same structure as plurality of teeth 220 as shown and described in FIGS. 2 and 3A-3B. Lock bar 404 is configured to slidably interface with lock assembly 202 to engage at least one tooth in the plurality of teeth with at least one latching mechanism of lock assembly 202 (e.g., when lock bar 204 is slid in a first direction). Lock bar 404 may comprise a retaining member 406 coupled to a distal end of lock bar 404. In certain embodiments, retaining member 406 may comprise a curved bar being secured coupled (e.g., welded) to a surface of lock bar 404 at a first end of retaining member 406 and extending vertically and laterally from the distal end of lock bar 404. Retaining member 406 may comprise a width or diameter that is small enough to extend a distal tip of retaining member 406 through an opening of link in a link chain 41; for example, retaining member 406 may comprise a width or diameter in the range of about ⅛ inch to about ½ inch. In accordance with certain aspects of the present disclosure, link chain 41 may be configured to secure a gate to a fence of a secured site.

In accordance with certain aspects of the present disclosure, tab 408 may comprise an aperture configured to receive the distal tip of retaining member 406 therethrough when keyless gate lock apparatus 400 is configured in a locked configuration. A user may of keyless gate lock apparatus 400 may configure keyless gate lock apparatus 400 in the locked configuration by interfacing link chain 41 with receiving member 406 and laterally sliding lock bar 404 into lock assembly 202 (e.g., from right-to-left when configured as shown in FIGS. 4A-4B) such that the distal end of receiving member 406 extends through the aperture of tab 408. Upon laterally sliding lock bar 404 into lock assembly 202, lock bar 404 may be interfaced with the at least one latching mechanism of lock assembly 202 to retain lock bar 204 in the locked position (e.g., as shown in FIGS. 4A-4B). The user of keyless gate lock apparatus 400 may interact with lock assembly 202 to the at least one latching mechanism of lock assembly 202 and unlock lock assembly 202 in the same manner as described in FIG. 2, above. Upon disengaging the at least one latching mechanism of lock assembly 202, the user may laterally slide lock bar 404 away from lock assembly 202 to remove receiving member 406 from the aperture of tab 408. Upon remove receiving member 406 from the aperture of tab 408, the user may remove link chain 41 from receiving member 406 such that the user may access the gate. In accordance with certain embodiments, as shown in FIG. 4B, keyless gate lock apparatus 400 may further comprise a cover 410 configured to be coupled to an exterior surface of lock assembly 202. Cover 410 may comprise an access tab 412 configured to open and close to selectively cover lock release button 218. Cover 410 may comprise an opening such that interface button 222 may still be accessed by the user of keyless gate lock apparatus 400 when cover 410 is coupled to the exterior surface of lock assembly 202.

Figure 5A:
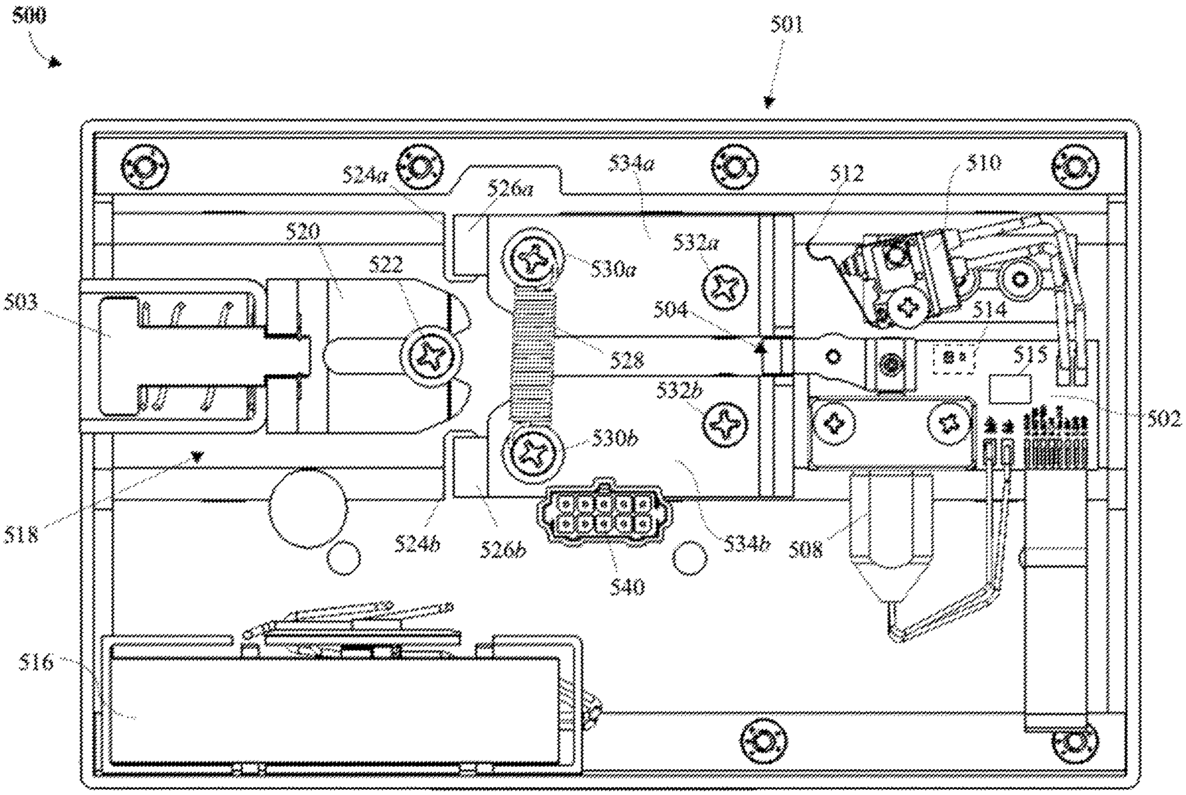
FIGS. 5A-5C are schematic diagrams of a locking assembly of a keyless gate lock apparatus, in accordance with certain aspects of the present disclosure.
Figure 5B:
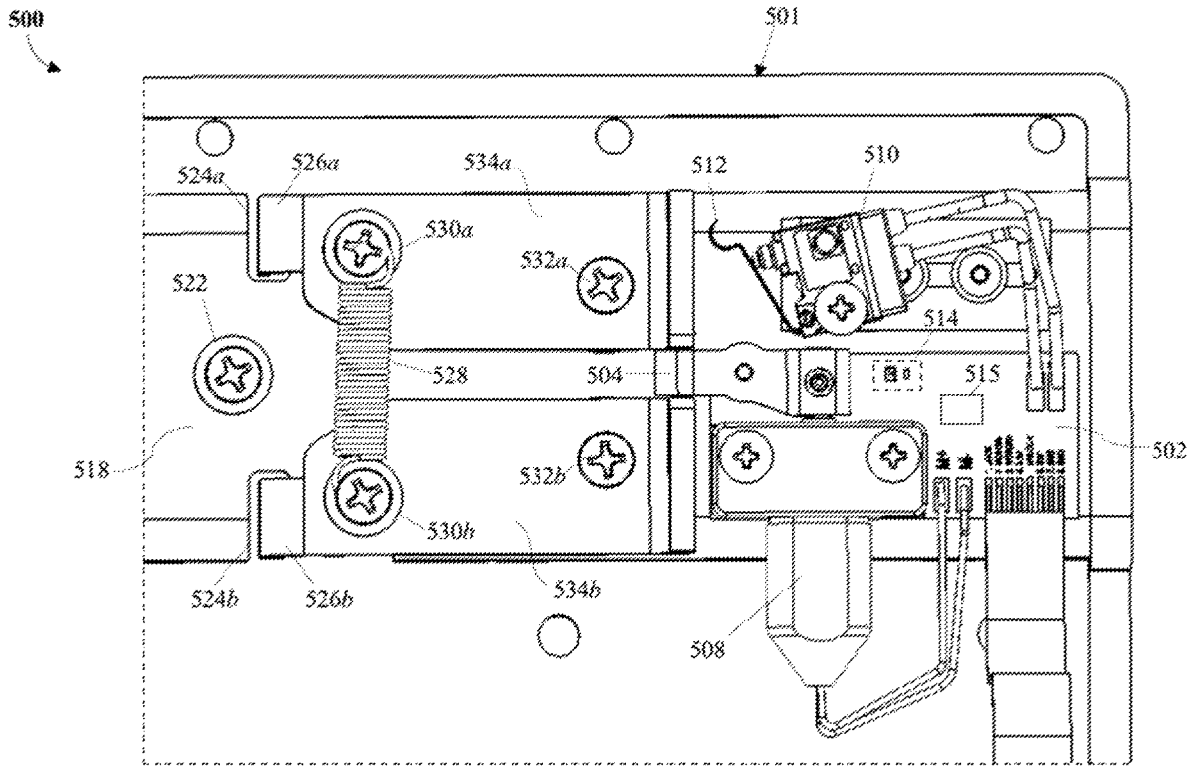
Figure 5C:
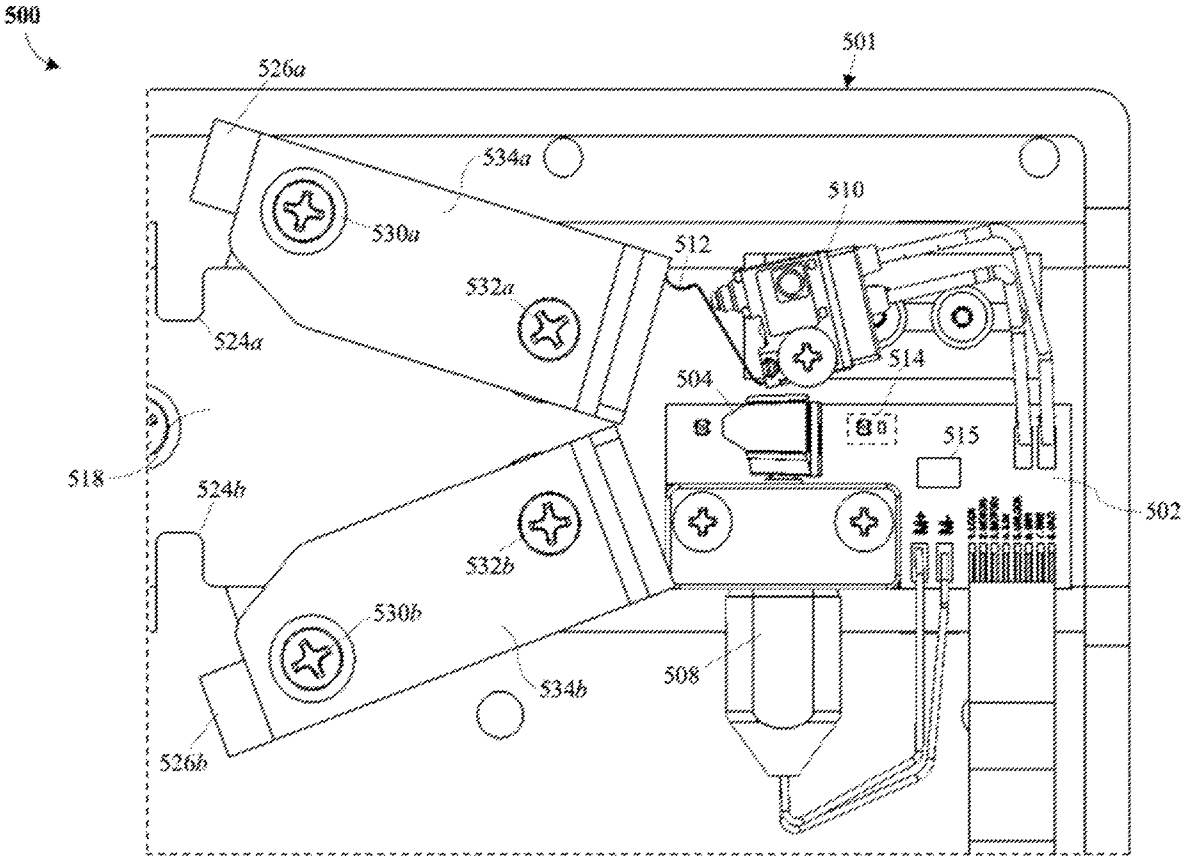

Referring now to FIGS. 5A-5C, schematic diagrams of a lock assembly 500 of a keyless gate lock apparatus are shown. In accordance with certain aspects of the present disclosure, lock assembly 500 may comprise lock assembly 102 in system 100, as shown and described in FIG. 1. Lock assembly 500 may also comprise lock assembly 202, as shown and described in FIGS. 2-4B. In accordance with certain embodiments, lock assembly 500 may comprise an exterior housing 501 configured to house components 502-540, as described below. Lock assembly 500 may comprise a lock plate 518 coupled to an interior surface of housing 501. Lock plate 518 may comprise apertures 524*a* and 524*b* disposed at an upper portion and lower portion of lock plate 518. Lock plate 518 may comprise a channel or track configure to receive and establish a slidable interface with lock bar 204 and/or lock bar 404 (as shown in FIGS. 2-3B and 4A-4B, respectively). Lock assembly 500 may comprise latching arms 534*a,b* comprising flanges 526*a,b*. Flanges 526*a,b* may be configured to interface with apertures 524*a,b* when latching arms 534*a,b* are configured in a closed position (as shown in FIGS. 5A-5B). In accordance with certain embodiments, latching arms 534*a,b* are configured to interface with the plurality of teeth of lock bar 204 (as shown in FIGS. 2-3B) to establish a locking interface between latching arms 534*a,b* and lock bar 204 (as shown in FIGS. 2-3B) when latching arms 534*a,b* are configured in the closed position. In certain embodiments, lock assembly 500 may comprise a spring 528 coupled to latching arms 534*a,b* via spring screws 530*a,b*. Spring 528 may be configured to bias latching arms 534*a,b* in the closed position while enabling latching arms 534*a,b* to be displace by the plurality of teeth of lock bar 204 (as shown in FIGS. 2-3B) when lock bar 204 is slidably interfaced with lock plate 518. Lock assembly 500 may comprise a lock release button 503 located at a lateral portion of housing 501. Lock release button 503 may be operably engaged with a lock release 520 to laterally drive lock release 520 when lock release button 503 is depressed by a user. Lock release 520 may be slidably interfaced with a lock release screw 522 configured to retain a position of lock release 520. In accordance with certain aspects of the present disclosure, when lock release button 503 is depressed by the user, lock release 520 is driven towards latching arms 534*a,b* and is configured to extend between latching arms 534*a,b* to apply force to rotate latching arms 534*a,b* around an axis of latching arm screws 532*a,b* to temporarily configure latching arms 534*a,b* in an open position, as shown in FIG. 5C. When latching arms 534*a,b* are forced into the open position by lock release 520, flanges 526*a,b* are disengaged from apertures 524*a,b* thereby releasing the plurality of teeth of lock bar 204 (as shown in FIGS. 2-3B). In accordance with certain aspects of the present disclosure, lock assembly 500 further comprises a blocker mechanism 504 configured to be actuated between a blocking position, as shown in FIG. 5B, and an unblocked position, as shown in FIG. 5C. When configured in the blocking position, blocker mechanism 504 is configured to extend between latching arms 534*a,b* such that latching arms 534*a,b* are blocked from rotating around the axis of latching arm screws 532*a,b* when engaged by lock release 520; thereby preventing the user from releasing the plurality of teeth of lock bar 204 (as shown in FIGS. 2-3B) in response to depressing lock release button 503.

As shown in FIGS. 5A-5C, lock assembly 500 further comprises a controller 502 comprising at least one microprocessor and computer-readable memory device, a switch 512, a switch assembly 510, an electronic actuator 508, and one or more sensors 514. Lock assembly 500 may comprise a battery pack 516 configured to provide a flow of power to the electronic components of lock assembly 500. Controller 502 may comprise a wireless communications module 515 configured to establish a wireless data transfer interface with at least one mobile electronic device (e.g., as described in system 100 of FIG. 1, above). Wireless communications module 515 may comprise a BLUETOOTH communications module comprising at least one radio frequency antenna. In accordance with certain aspects of the present disclosure, wireless communications module 515 may receive at least one wireless signal from the at least one mobile electronic device. The wireless signal may comprise a data packet comprising one or more electronic access credentials comprising an access request for lock assembly 500. Controller 500 may process the electronic access credentials according to one or more operations stored in memory (e.g., as described in more detail in FIGS. 6-7, below) to authenticate the electronic access credentials and grant or deny the access request. In response to authenticating the electronic access credentials, controller 500 may be configured to command electronic actuator 508 to actuate blocker mechanism 504 from a blocked position (as shown in FIG. 5B) to an unblocked position (as shown in FIG. 5C). In certain embodiments, controller 502 may be configured to send a communication to the mobile electronic device to confirm the access request for lock assembly 500 and/or provide an indication, such as an audible beep or visible light at an exterior surface of housing 501, to indicate lock assembly 500 may be unlocked via lock release button 503. In accordance with certain embodiments, in response to the user actuating lock release button 503, a surface of latching arm 534*a* may contact switch 512. Switch assembly 510 may be configured to generate an input signal in response to latching arm 534*a* contacting switch 512 and communicate the input signal to controller 502. Controller 502 may process the input signal to determine a status of lock assembly 500 as "unlocked." Controller 502 may be configured to store the lock status in memory and/or send a communication via wireless communications module 515 to the mobile electronic device and/or one or more remote server. In accordance with certain embodiments, sensors 514 may comprise one or more accelerometer, capacitive displacement sensor, Eddy-current sensor, Hall effect sensor, inductive sensor, Laser Doppler vibrometer, linear variable differential transformer, piezo-electric transducer, one or more position encoder, potentiometer, proximity sensor (optical), string potentiometer, and/or ultrasonic sensor. Sensors 514 may be configured to measure one or more movements, conditions and/or activity events for lock assembly 500 and may be communicably engaged with controller 502 to provide one or more sensor inputs thereto. In accordance with certain embodiments, sensors 514 may be configured to detect one or more tamper events and/or unauthorized access attempts for lock assembly 500. Controller 502 may be configured to store the one or more sensor inputs in memory and/or communicate the sensor data to via wireless communications module 515 to the mobile electronic device and/or the one or more remote server to maintain an audit log for lock assembly 500 and/or alert a remote user to one or more tamper events and/or unauthorized access attempts for lock assembly 500. Lock assembly 500 may further comprise at least one bus 540 configured to establish a wired data transfer interface between controller 502 and at least one computing device.

Figure 6:
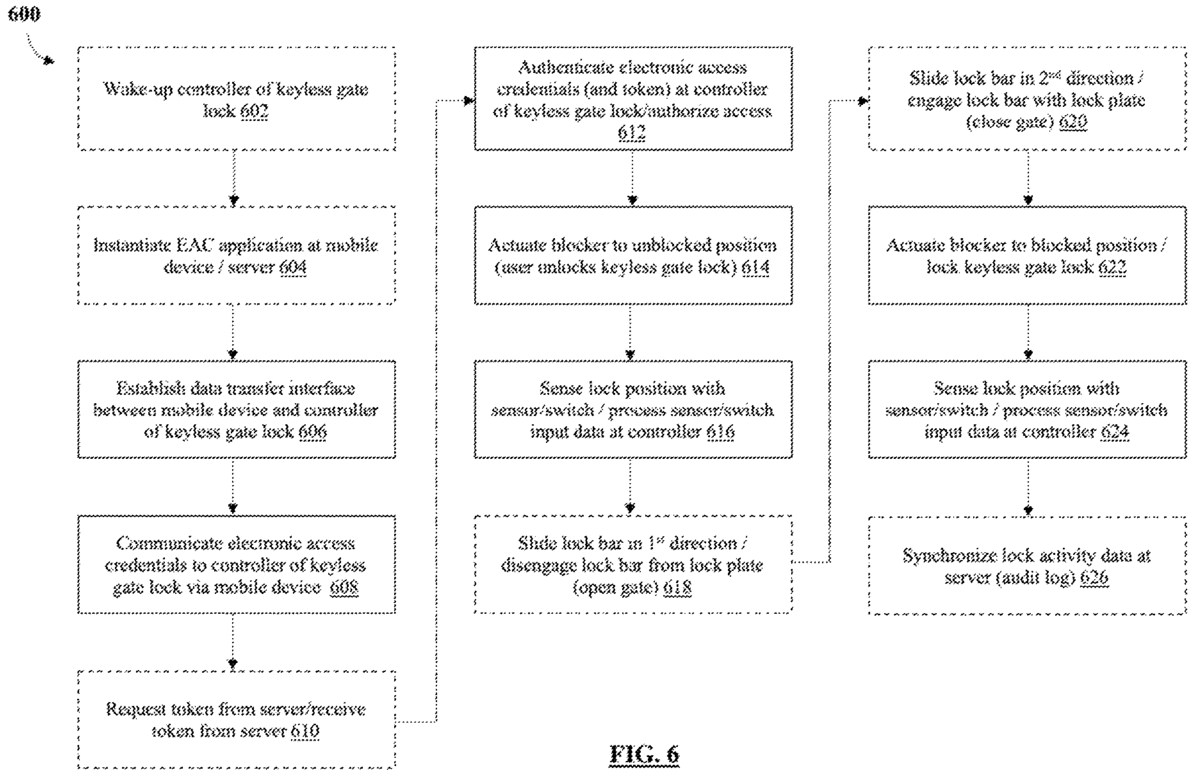
FIG. 6 is a process flow diagram of a routine of a keyless gate lock system, in accordance with certain aspects of the present disclosure.

Referring now to FIG. 6, a process flow diagram of a routine 600 of a keyless gate lock system is shown. In accordance with certain aspects of the present disclosure, routine 600 may comprise one or more system routines for keyless gate lock system 100 of FIG. 1. One or more steps of routine 600 may be embodied as one or more operations of lock assembly 202, as shown and described in FIGS. 2-4B, and/or one or more operations of lock assembly 500, as shown and described in FIG. 5.

In accordance with certain aspects of the present disclosure, routine 600 may be initiated upon executing one or more steps or operations for waking up a controller of a keyless gate lock (Step 602). In accordance with certain aspects of the present disclosure, the keyless gate lock is configured to selectively secure a gate for a secured site. Step 602 may comprise receiving a user-generated input via an interface (e.g., a button) of the keyless gate lock configured to engage the controller from a power-save state to an operational state. Routine 600 may further comprise one or more steps or operations for instantiating an instance of a EAC application at a mobile electronic device and/or at an EAC server (Step 604). The EAC application may comprise a graphical user interface configured to enable a user of the mobile electronic device to send and receive one or more communications to/from the controller of the keyless gate lock. Routine 600 may proceed by executing one or more steps or operations for establishing a wireless data transfer interface between the mobile electronic device and the controller of the keyless gate lock (Step 606). Step 606 may comprise one or more steps for receiving one or more user-generated inputs at the graphical user interface for establishing the data transfer interface. Routine 600 may proceed by executing one or more steps or operations for communicating electronic access credentials from the mobile electronic device to the controller of the keyless gate lock via the wireless data transfer interface (Step 608). In certain embodiments, routine 600 may comprise one or more steps or operations for communicating an authentication request from the mobile electronic device to the EAC server. The EAC server may process the authentication request to generate an authentication token for the mobile electronic device and communicate the authentication token to the mobile electronic device (Step 610). Routine 600 may proceed by executing one or more steps or operations for authenticating the electronic access credentials (and optionally the authentication token) at the controller of the keyless gate lock to authorize the electronic access request (Step 612).

In response to successfully authenticating the electronic access credentials at step 612, routine 600 may comprise one or more steps or operations for actuating a blocker mechanism of the keyless gate lock from a blocked position to an unblocked position (Step 614). The user may then, optionally, actuate an unlock mechanism unlock the keyless gate lock. In accordance with certain aspects of the present disclosure, routine 600 may comprise one or more steps or operations for sensing a state or position of at least one component of the keyless gate lock with at least one sensor or switch communicably engaged with the controller of the keyless gate lock (Step 616). Step 616 may further comprise one or more steps or operations for receiving and processing an input from the one sensor or switch to determine a lock status (i.e., locked or unlocked) for the key less gate lock.

Step 616 may further comprise one or more steps or operations for communicating the sensor/switch data and/or the lock status to the EAC server and/or the mobile electronic device. Routine 600 may proceed in response to the user sliding a lock bar of the keyless gate lock in a first direction to disengage the lock bar from a lock plate to access a gate for a secured enclosure (Step 618) and sliding the lock bar of the keyless gate lock in a second direction to engage the lock bar with the lock plate to secure the gate for the secured enclosure (Step 620). Routine 600 may comprise one or more operations for actuating the blocker mechanism from the unblocked position to the blocked position to lock the keyless gate lock (Step 622). Step 622 may comprise receiving at least one user generated input, optionally via an input device (e.g., button) located on the keyless gate lock. Routine 600 may comprise one or more steps or operations for sensing a state or position of at least one component of the keyless gate lock with the at least one sensor or switch communicably engaged with the controller of the keyless gate lock and communicating the sensor/switch data to the controller of the keyless gate lock (Step 624). Step 624 may further comprise one or more steps or operations for processing the sensor/switch data at the controller to determine a lock status of the keyless gate lock. Step 624 may further comprise one or more steps or operations for communicating the sensor/switch data to the EAC server and/or the mobile electronic device. In certain embodiments, routine 600 may comprise one or more operations for synchronizing activity data stored at the controller of the keyless gate lock and/or the mobile electronic device to generate at least one audit log for the keyless gate lock (Step 626).

Figure 7:
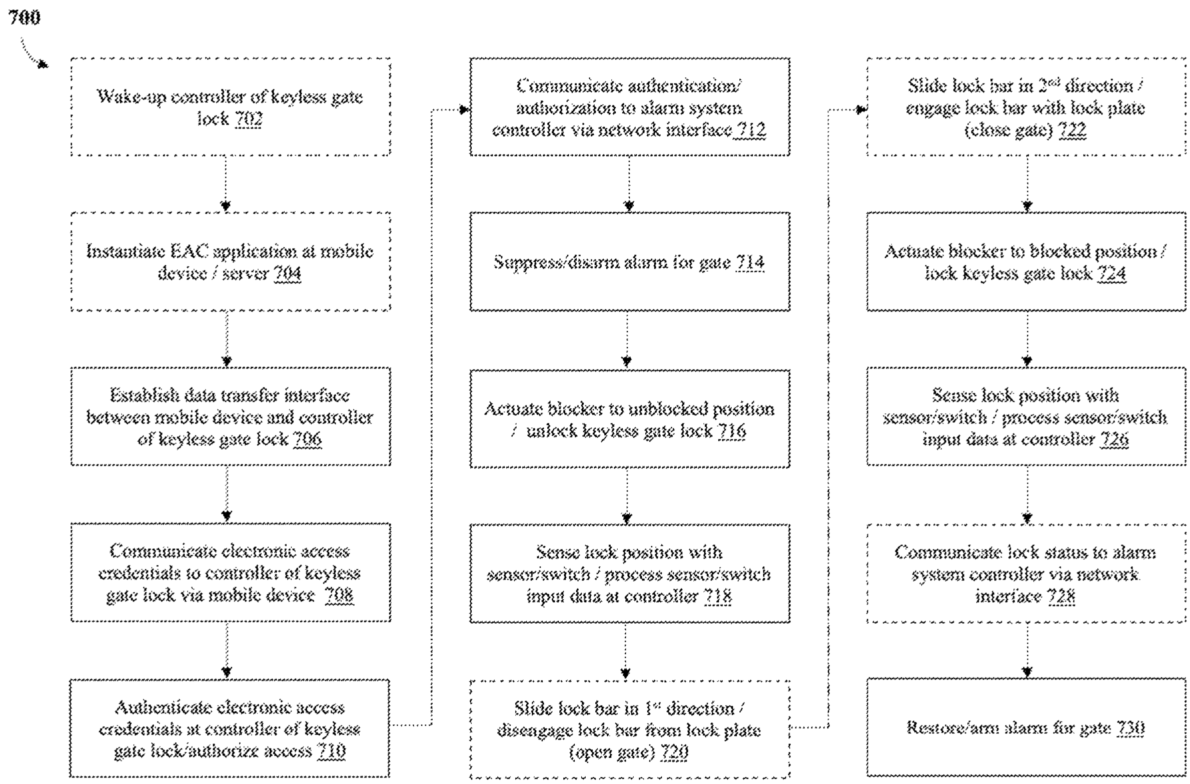
FIG. 7 is a process flow diagram of a routine of a keyless gate lock system, in accordance with certain aspects of the present disclosure.

Referring now to FIG. 7, a process flow diagram of a routine 700 of a keyless gate lock system is shown. In accordance with certain aspects of the present disclosure, routine 700 may comprise one or more system routines for keyless gate lock system 100 of FIG. 1. One or more steps of routine 700 may be embodied as one or more operations of lock assembly 202, as shown and described in FIGS. 2-4B, and/or one or more operations of lock assembly 500, as shown and described in FIG. 5. In accordance with certain aspects of the present disclosure, routine 700 may be successive or sequential to one or more steps or operations of routine 600, as shown in FIG. 6, and/or may comprise one or more sub-steps or sub-routines of routine 600.

In accordance with certain aspects of the present disclosure, routine 700 may be initiated upon executing one or more steps or operations for waking up a controller of a keyless gate lock (Step 702). In accordance with certain aspects of the present disclosure, the keyless gate lock is configured to selectively secure a gate for a secured enclosure. Step 702 may comprise receiving a user-generated input via an interface (e.g., a button) of the keyless gate lock configured to engage the controller from a power-save state to an operational state. Routine 700 may further comprise one or more steps or operations for instantiating an instance of a EAC application at a mobile electronic device and/or at an EAC server (Step 704). The EAC application may comprise a graphical user interface configured to enable a user of the mobile electronic device to send and receive one or more communications to/from the controller of the keyless gate lock. Routine 700 may proceed by executing one or more steps or operations for establishing a wireless data transfer interface between the mobile electronic device and the controller of the keyless gate lock (Step 706). Step 706 may comprise one or more steps for receiving one or more user-generated inputs at the graphical user interface for establishing the data transfer interface. Routine 700 may proceed by executing one or more steps or operations for communicating electronic access credentials from the mobile electronic device to the controller of the keyless gate lock via the wireless data transfer interface (Step 708). Routine 700 may proceed by executing one or more steps or operations for authenticating the electronic access credentials at the controller of the keyless gate lock to authorize the electronic access request (Step 710).

In response to successfully authenticating the electronic access credentials at step 710, routine 700 may comprise one or more steps or operations for communicating the authentication/authorization to an alarm system controller via a network communications interface (Step 712). Routine 700 may comprise one or more steps or operations for receiving/processing the communication at the alarm system controller according to one or more alarm system control parameters and suppressing or disarming an alarm for the gate (Step 714). Step 714 may optionally comprise one or more operations for communicating an alarm suppression confirmation from the alarm system to the controller of the keyless gate lock and/or the mobile electronic device. Routine 700 may proceed by executing one or more steps or operations for actuating a blocker mechanism of the keyless gate lock from a blocked position to an unblocked position (Step 716). The user may then, optionally, actuate an unlock mechanism (e.g., an unlock button) to unlock the keyless gate lock. In accordance with certain aspects of the present disclosure, routine 700 may comprise one or more steps or operations for sensing a state or position of at least one component of the keyless gate lock with at least one sensor or switch communicably engaged with the controller of the keyless gate lock (Step 718). Step 718 may further comprise one or more steps or operations for receiving and processing an input from the one sensor or switch to determine a lock status (i.e., locked or unlocked) for the key less gate lock.

Routine 700 may proceed in response to the user sliding a lock bar of the keyless gate lock in a first direction to disengage the lock bar from a lock plate to access the gate for the secured enclosure (Step 720) and sliding the lock bar of the keyless gate lock in a second direction to engage the lock bar with the lock plate to secure the gate for the secured enclosure (Step 722). Routine 700 may comprise one or more operations for actuating the blocker mechanism from the unblocked position to the blocked position to lock the keyless gate lock (Step 724). Step 724 may comprise one or more steps or operations for receiving at least one user generated input, optionally via an input device (e.g., button) located on the keyless gate lock. Routine 700 may comprise one or more steps or operations for sensing a state or position of at least one component of the keyless gate lock with the at least one sensor or switch communicably engaged with the controller of the keyless gate lock and communicating the sensor/switch data to the controller of the keyless gate lock (Step 726). Step 726 may further comprise one or more steps or operations for processing the sensor/switch data at the controller to determine a lock status of the keyless gate lock. Routine 700 may proceed by executing one or more steps or operations for communicating lock status data for the keyless gate lock to the alarm system controller via the network interface (Step 728). In certain embodiments, routine 700 may comprise one or more operations for processing the lock status data at the alarm system controller to restore or arm the at least one alarm for the gate (Step 730).

Figure 8:
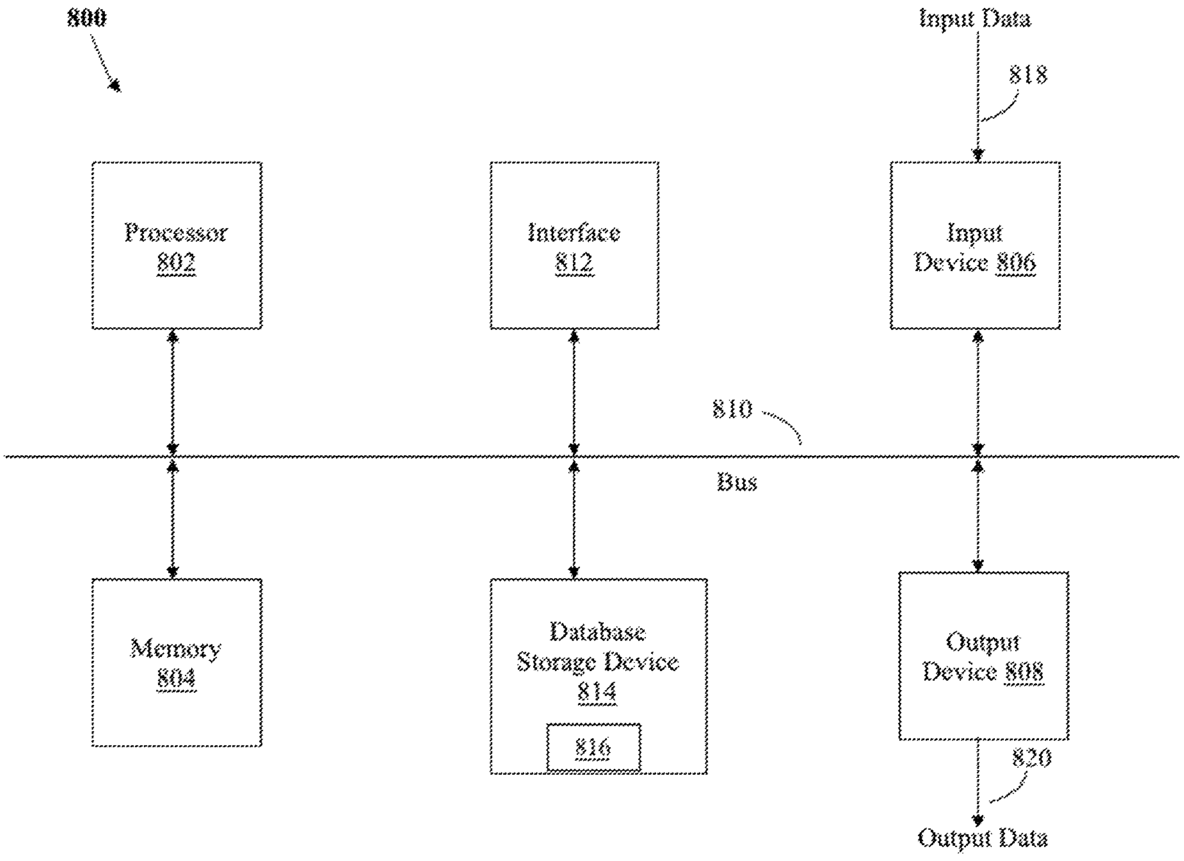
FIG. 8 is an illustrative embodiment of a computing device through which one or more aspects of the present disclosure may be implemented.

Referring now to FIG. 8, a processing system 800 in which one or more aspects of the present disclosure may be implemented is shown. For example, processing system 800 may comprise one or more devices and systems of the present disclosure including, but not limited to, one or more mobile electronic device, server, alarm system controller, electronic access controller, electronic access control system interface, and the like. According to an embodiment, processing system 800 may generally comprise at least one processor 802, or processing unit or plurality of processors, a memory 804, at least one input device 806 and at least one output device 808, coupled together via a bus or group of buses 810. In certain embodiments, input device 806 and output device 808 could be the same device. An interface 812 can also be provided for coupling the processing system 800 to one or more peripheral devices; for example, interface 812 could be a PCI card or PC card. At least one storage device 814 which houses at least one database 816 can also be provided. The memory 804 can be any form of memory device, for example, volatile or non-volatile memory, solid state storage devices, magnetic devices, etc. The processor 802 could comprise more than one distinct processing device, for example to handle different functions within the processing system 800. Input device 806 receives input data 818 and can comprise, for example, a keyboard, a pointer device such as a pen-like device or a mouse, audio receiving device for voice-controlled activation such as a microphone, data receiver or antenna (e.g., radio frequency transceiver), a modem or wireless data adaptor, data acquisition card, etc. Input data 818 could come from different sources, for example keyboard instructions in conjunction with data received via a network. Output device 808 produces or generates output data 820 and can comprise, for example, a display device or monitor in which case output data 80 is visual, a printer in which case output data 820 is printed, a port for example a USB port, a peripheral component adaptor, a data transmitter or antenna such as a modem or wireless network adaptor, BLUETOOTH, NFC, RFID, LoRA, etc. Output data 820 could be distinct and derived from different output devices, for example a visual display on a monitor in conjunction with data transmitted to a network. A user could view data output, or an interpretation of the data output, on, for example, a monitor or using a printer. The storage device 814 can be any form of data or information storage means, for example, volatile or non-volatile memory, solid state storage devices, magnetic devices, etc.

In use, the processing system 800 is adapted to allow data or information to be stored in and/or retrieved from, via wired or wireless communication means, at least one database 816. The interface 812 may allow wired and/or wireless communication between the processing unit 802 and peripheral components that may serve a specialized purpose. In general, the processor 802 can receive instructions as input data 818 via input device 806 and can display processed results or other output to a user by utilizing output device 808. More than one input device 806 and/or output device 808 can be provided. It should be appreciated that the processing system 800 may be any form of terminal, server, specialized hardware, or the like.

It is to be appreciated that the processing system 800 may be a part of a networked communications system. Processing system 800 could connect to a network, for example the Internet or a WAN. Input data 818 and output data 820 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 800 illustrated in FIG. 8 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 8 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 800 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 800, or portions thereof, may be stored in a remote memory storage device. It is to be appreciated that the illustrated network connections of FIG. 8 are exemplary and other means of establishing a communications link between multiple computers may be used.

FIG. 8 is intended to provide a brief, general description of an illustrative and/or suitable exemplary environment in which embodiments of the below described present invention may be implemented. FIG. 8 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As provided in the preceding detailed description of the several views of the drawings, certain embodiments have been described with reference to acts and symbolic representations of operations that are performed by one or more computing devices, such as the computing system environment 800 of FIG. 8. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations, including, but not limited to, those provided herein. Examples of well-known computing systems, environments, and configurations that may be suitable for use with an embodiment include, but are not limited to, smart phones, tablet computers, electronic access control devices, personal computers, handheld or laptop devices, personal digital assistants, multiprocessor systems, microprocessor-based systems, set top boxes, programmable consumer electronics, network, minicomputers, server computers, electronic access control server computers, alarm system server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As will be appreciated by one of skill in the art, one or more aspects of the present disclosure may be embodied as a method (including, for example, a computer-implemented process, a system routine, and/or any other process), an apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A keyless locking system comprising:

a lock assembly comprising a housing configured to be coupled to a first surface of a gate or a fence;

a lock plate configured to be coupled to a second surface of the gate or the fence, wherein the lock plate comprises a receiving portion; and a lock bar comprising an elongated body extending from a first end to a second end, wherein the elongated body comprises a plurality of teeth disposed on a linear portion of the elongated body between the first end and the second end, wherein the second end of the lock bar comprises a retaining member configured to selectively interface with the receiving portion of the lock plate, wherein the lock plate is coupled to a mounting bracket that enables positional adjustment of the receiving portion relative to the retaining member along at least one axis, wherein the lock bar is configured to slidably interface with the lock assembly, wherein the lock assembly comprises at least one latching mechanism configured to establish a locking interface with the plurality of teeth to selectively secure the lock bar to the lock assembly in at least one direction, wherein the lock assembly further comprises:

an electronic actuator operably engaged with a blocking mechanism, wherein the electronic actuator is configured to actuate the blocking mechanism between a first position and a second position, wherein the blocking mechanism is configured to retain the at least one latching mechanism in a locked configuration when the blocking mechanism is configured in the first position;

a controller operably engaged with the electronic actuator, the controller comprising a wireless communications module, at least one processor and at least one non-transitory computer readable medium comprising instructions stored thereon that, when executed, cause the processor to perform one or more operations, the one or more operations comprising:

establishing a wireless data transfer interface with at least one mobile electronic device;

receiving electronic access credentials from the at least one mobile electronic device via the wireless data transfer interface;

authenticating the electronic access credentials; and commanding the electronic actuator to actuate the blocking mechanism from the first position to the second position in response to successfully authenticating the electronic access credentials.

2. The keyless locking system of claim 1 wherein the lock assembly further comprises a release mechanism configured to disengage the locking interface between the at least one latching mechanism and the plurality of teeth, wherein the release mechanism comprises an actuator disposed at an exterior surface of the housing.

3. The keyless locking system of claim 1 further comprising a first mounting attachment configured to be coupled to the first surface of the gate or the fence, wherein the housing of the lock assembly is configured to be coupled to the first mounting attachment.

4. The keyless locking system of claim 3 further comprising a second mounting attachment configured to be coupled to the second surface of the gate or the fence, wherein the lock plate is configured to be coupled to the second mounting attachment.

5. The keyless locking system of claim 3 further comprising a mounting plate configured to be coupled to the first mounting attachment, wherein the housing of the lock assembly is configured to be coupled to the mounting plate.

6. The keyless locking system of claim 1 wherein the receiving portion of the lock plate comprises a recessed cavity and a surrounding guard flange configured to inhibit prying or tampering of the retaining member when the retaining member is engaged with the receiving portion.

* * * * *